United States Patent
Oike (10) Patent No.: US 10,738,894 B2
(45) Date of Patent: Aug. 11, 2020

(54) VALVE MECHANISM FOR REMOVING FOREIGN MATTER AT VALVE PORT

(71) Applicant: TLV CO., LTD., Hyogo (JP)

(72) Inventor: Tadashi Oike, Kakogawa (JP)

(73) Assignee: TLV CO., LTD., Hyogo (JP)

(*) Notice: Subject to any disclaimer, the term of this patent is extended or adjusted under 35 U.S.C. 154(b) by 0 days.

(21) Appl. No.: 16/208,161

(22) Filed: Dec. 3, 2018

(65) Prior Publication Data

US 2019/0107207 A1 Apr. 11, 2019

Related U.S. Application Data (63) Continuation of application No. PCT/JP2017/016676, filed on Apr. 27, 2017.

(30) Foreign Application Priority Data

Jun. 15, 2016 (JP) ................. 2016-118842

(51) Int. Cl.
  *F16K 1/38* (2006.01)
  *F16K 51/00* (2006.01)
  (Continued)

(52) U.S. Cl.
  CPC ................ *F16K 1/38* (2013.01); *F16K 1/385* (2013.01); *F16K 1/42* (2013.01); *F16K 1/422* (2013.01);
  (Continued)

(58) Field of Classification Search
  CPC ... F16K 1/38; F16K 1/54; F16K 1/385; F16K 1/422; F16K 51/00; F16K 1/42; F16K 25/00; F16T 1/00
  (Continued)

(56) References Cited

U.S. PATENT DOCUMENTS 2,061,852 A * 11/1936 Schweitzer ............... F16K 1/54
  251/122
2,746,800 A * 5/1956 Voit ....................... F02M 61/06
  239/584
(Continued)

FOREIGN PATENT DOCUMENTS

CN   1543543 A    11/2004
JP   S4617461 B1   5/1971
(Continued)

OTHER PUBLICATIONS

International Search Report issued in PCT/JP2017/016676; dated Jun. 27, 2017.
(Continued)

*Primary Examiner* — John Bastianelli
(74) *Attorney, Agent, or Firm* — Studebaker & Brackett PC (57) ABSTRACT

A flow rate adjusting valve includes: a casing including an inlet, an outlet, and a channel connecting the inlet and the outlet to each other; a valve port disposed in the channel; and a valve body that is disposed upstream of the valve port and moves forward and backward relative to the valve port to adjust an opening degree of an upstream opening of the valve port. The valve port includes a narrowing portion whose opening diameter is smaller than that of the upstream opening, and an enlarging portion continuous to a downstream side of the narrowing portion and having an opening diameter of the narrowing portion. When the upstream opening is at a predetermined opening degree, an area of the valve port through which a fluid passes is at minimum at the narrowing portion.

3 Claims, 5 Drawing Sheets

(51) Int. Cl.
  *F16K 1/42* (2006.01)
  *F16K 1/54* (2006.01)
  *F16K 25/00* (2006.01)
  *F16T 1/00* (2006.01)

(52) U.S. Cl.
  CPC ............... *F16K 1/54* (2013.01); *F16K 25/00* (2013.01); *F16K 51/00* (2013.01); *F16T 1/00* (2013.01)

(58) Field of Classification Search
  USPC .................................. 251/120–122, 332–333
  See application file for complete search history.

(56) References Cited

U.S. PATENT DOCUMENTS

| | | | | |
|---|---|---|---|---|
| 3,035,780 | A * | 5/1962 | Peras ..................... | F02M 61/06 239/453 |
| 3,703,273 | A * | 11/1972 | Illing ....................... | F16K 1/38 251/122 |
| 4,337,788 | A * | 7/1982 | Seger ...................... | E21B 34/02 251/122 |
| 4,413,646 | A * | 11/1983 | Platt ........................ | F16K 25/04 137/240 |
| 4,479,509 | A * | 10/1984 | Dear ....................... | F16K 47/02 251/122 |
| 4,524,914 | A * | 6/1985 | Kaibara ................. | F02M 61/06 239/452 |
| 6,698,449 | B2 * | 3/2004 | Hall ........................ | F16K 1/422 137/315.41 |
| 2003/0062495 | A1 | 4/2003 | Long et al. | |
| 2003/0089869 | A1 * | 5/2003 | Hall ......................... | F16K 1/38 251/122 |
| 2017/0002931 | A1 | 1/2017 | Shu et al. | |

FOREIGN PATENT DOCUMENTS

| | | |
|---|---|---|
| JP | S5344326 U | 4/1978 |
| JP | S6260770 U | 4/1987 |
| JP | 2001-027391 A | 1/2001 |
| JP | 2004340260 A | 12/2004 |
| JP | 2005-500484 A | 1/2005 |
| JP | 2007-032980 A | 2/2007 |
| JP | 4980312 B2 | 7/2012 |
| WO | 03/016759 A1 | 2/2003 |
| WO | 2015/139647 A1 | 9/2015 |

OTHER PUBLICATIONS

The extended European search report issued by the European Patent Office dated Jun. 21, 2019, which corresponds to EP17813028.2-1015 and is related to U.S. Appl. No. 16/208,161.

An Office Action mailed by the State Intellectual Property Office of the People's Republic of China dated Jul. 1, 2019, which corresponds to Chinese Patent Application No. 201780034893.3 and is related to U.S. Appl. No. 16/208,161.

* cited by examiner

FIG.1

OPENING AXIS

UPSTREAM ⟷ DOWNSTREAM

VALVE MECHANISM FOR REMOVING FOREIGN MATTER AT VALVE PORT

CROSS-REFERENCE TO RELATED APPLICATION

This is a continuation of PCT International Application PCT/JP2017/016676 filed on Apr. 27, 2017, which claims priority to Japanese Patent Application No. 2016-118842 filed on Jun. 15, 2016. The disclosures of these applications including the specifications, the drawings, and the claims are hereby incorporated by reference in their entirety.

FIELD

The present application relates to a valve mechanism that discharges a fluid such as drain or steam from a valve port, and more particularly to measures for removing foreign matter at the valve port.

BACKGROUND

A known valve mechanism discharges a fluid such as a drain or steam from a valve port. Such a valve mechanism has the problem of clogging of the valve port caused by foreign matter included in the fluid and deposited on the valve port. A technique for solving this problem is disclosed in Japanese Patent Application Publication No. 2001-27391, for example. In the technique disclosed in Japanese Patent Application Publication No. 2001-27391, a foreign matter removing member disposed in the valve port (orifice) is caused to roll by a fluid passing through the valve port to thereby automatically remove foreign matter attached and deposited on the valve port.

SUMMARY

The technique described above, however, cannot sufficiently remove especially foreign matter having a large adhesive force. In a valve mechanism in which a valve body moves forward and backward relative to a valve port to adjust the opening degree of the valve port, it is substantially difficult to dispose a foreign matter removing member in the valve port in a manner similar to the technique described above.

The technique disclosed in the present application has been made in view of the foregoing circumstances, and has an object of preventing attachment and deposition of foreign matter on a valve port in a valve mechanism in which a valve body moves forward and backward relative to the valve port to adjust the opening degree of the valve port.

To achieve the object, the technique disclosed in the present application provides a narrowing portion for forming a negative-pressure region in the valve port in order to discharge foreign matter downstream by using the negative-pressure region.

Specifically, a valve mechanism according to the present application includes a casing, a valve port, and a valve body. The casing includes an inlet and an outlet of a fluid and also includes a channel connecting the inlet and the outlet to each other. The valve port is disposed in the channel. The valve body is disposed upstream of the valve port and moves forward and backward relative to the valve port to adjust an opening degree of an upstream opening of the valve port. The valve port includes a narrowing portion and an enlarging portion. The narrowing portion has an opening diameter smaller than an opening diameter of the upstream opening. The enlarging portion is continuous to a downstream side of the narrowing portion and has an opening diameter larger than the opening diameter of the narrowing portion. When the upstream opening is at a predetermined opening degree, an area of the valve port through which the fluid passes is at minimum at the narrowing portion.

In the valve mechanism according to the present application, the flow rate of the fluid is at maximum at the narrowing portion in the valve port. Accordingly, a negative pressure is generated in the narrowing portion, and with this negative pressure, foreign matter remaining upstream is sucked into the narrowing portion and is discharged downstream. As a result, attachment and deposition of foreign matter at the valve port can be prevented.

DESCRIPTION OF EMBODIMENTS

Embodiments of the present application will be described hereinafter with reference to the drawings. The following embodiments are merely preferred examples in nature, and are not intended to limit techniques disclosed in this application, applications of the techniques, and use of the application.

A flow rate adjusting valve 10 according to this embodiment is disposed in, for example, a steam system and is used for discharging a given amount of steam, and constitutes a valve mechanism recited in claims of the present application. The steam is an example of a fluid for which the flow rate adjusting valve 10 is used.

Figure 1:
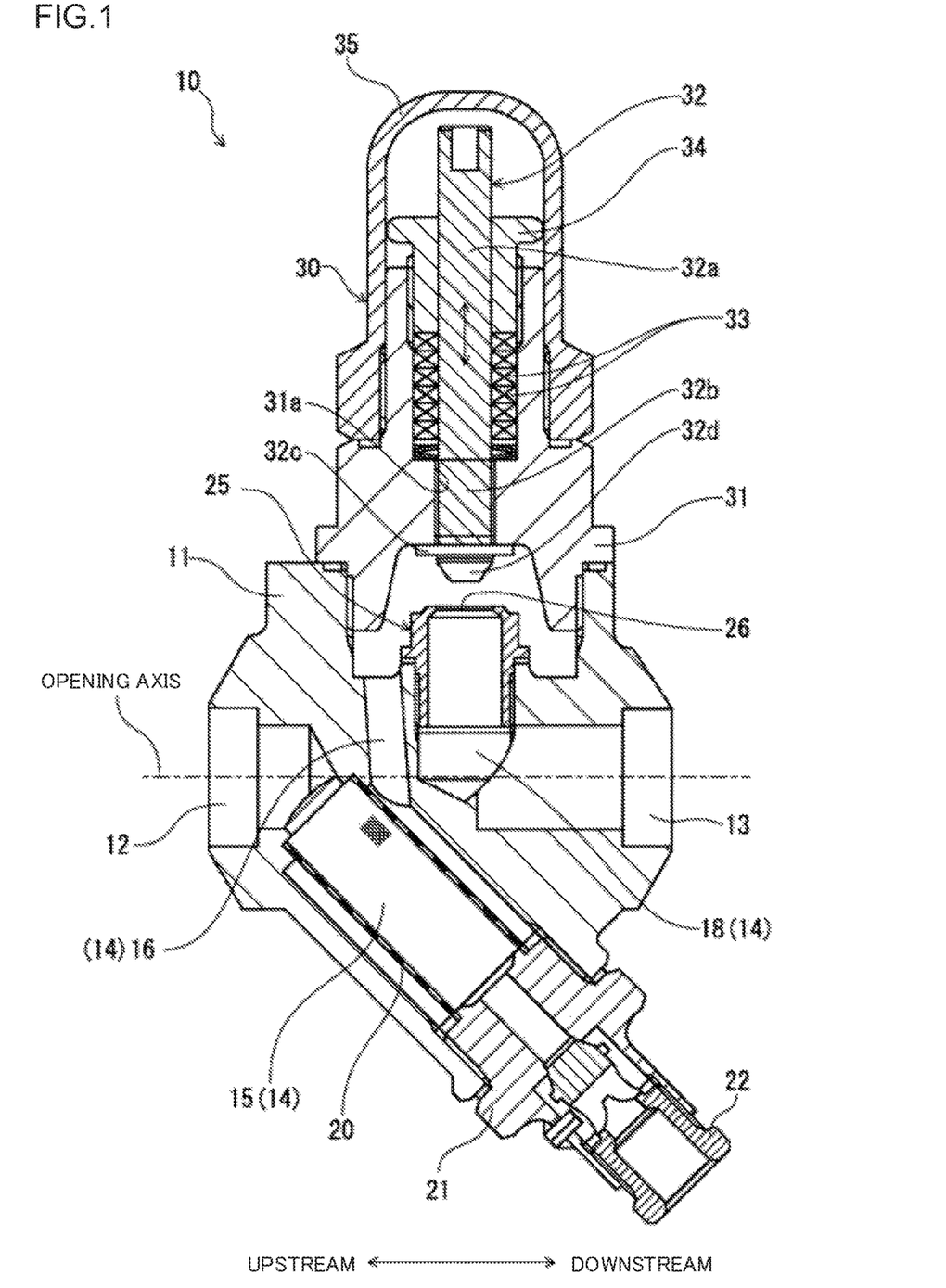
FIG. 1 is a cross-sectional view illustrating a schematic configuration of a flow rate adjusting valve (valve mechanism) according to an embodiment.

As illustrated in FIG. 1, the flow rate adjusting valve 10 according to this embodiment includes a casing 11, a screen 20, a valve port member 25, and a flow-rate adjusting mechanism 30.

The casing 11 has a substantially Y shape, and steam is distributed in the casing 11. The casing 11 includes an inlet 12 and an outlet 13 of steam, and also includes a channel 14 connecting the inlet 12 and the outlet 13 to each other. The inlet 12 and the outlet 13 are opposed to each other in an upstream-downstream direction, and has a common opening axis. The channel 14 includes a blow passage 15, a connection passage 16, and a valve port passage 18.

The blow passage 15 tilts relative to the opening axis and is connected to the inlet 12. The connection passage 16 is a passage extending substantially in the radial direction about the opening axis (i.e., in the radial direction of a circle about the opening axis), and connects the blow passage 15 and the valve port passage 18 to each other (i.e., allows the blow passage 15 and the valve port passage 18 to communicate with each other). The valve port passage 18 is a passage extending in the radial direction about the opening axis, and is connected to the outlet 13. The valve port passage 18 is provided with a valve port member 25 described later.

The screen 20 is disposed in the blow passage 15. The screen 20 has a cylindrical shape extending in the axial direction of the blow passage 15, and is open at one end toward the inlet 12. A screen holder 21 holding the screen 20 is screwed to an opening end of the blow passage 15 in the casing 11. The screen 20 constitutes a filter member that captures foreign matter included in steam that has flowed into the blow passage 15 from the inlet 12. The screen holder 21 is provided with a blow valve 22. When the blow valve 22 is opened, the foreign matter captured by the screen 20 is thereby discharged outward with a flow of the steam.

Figure 2:
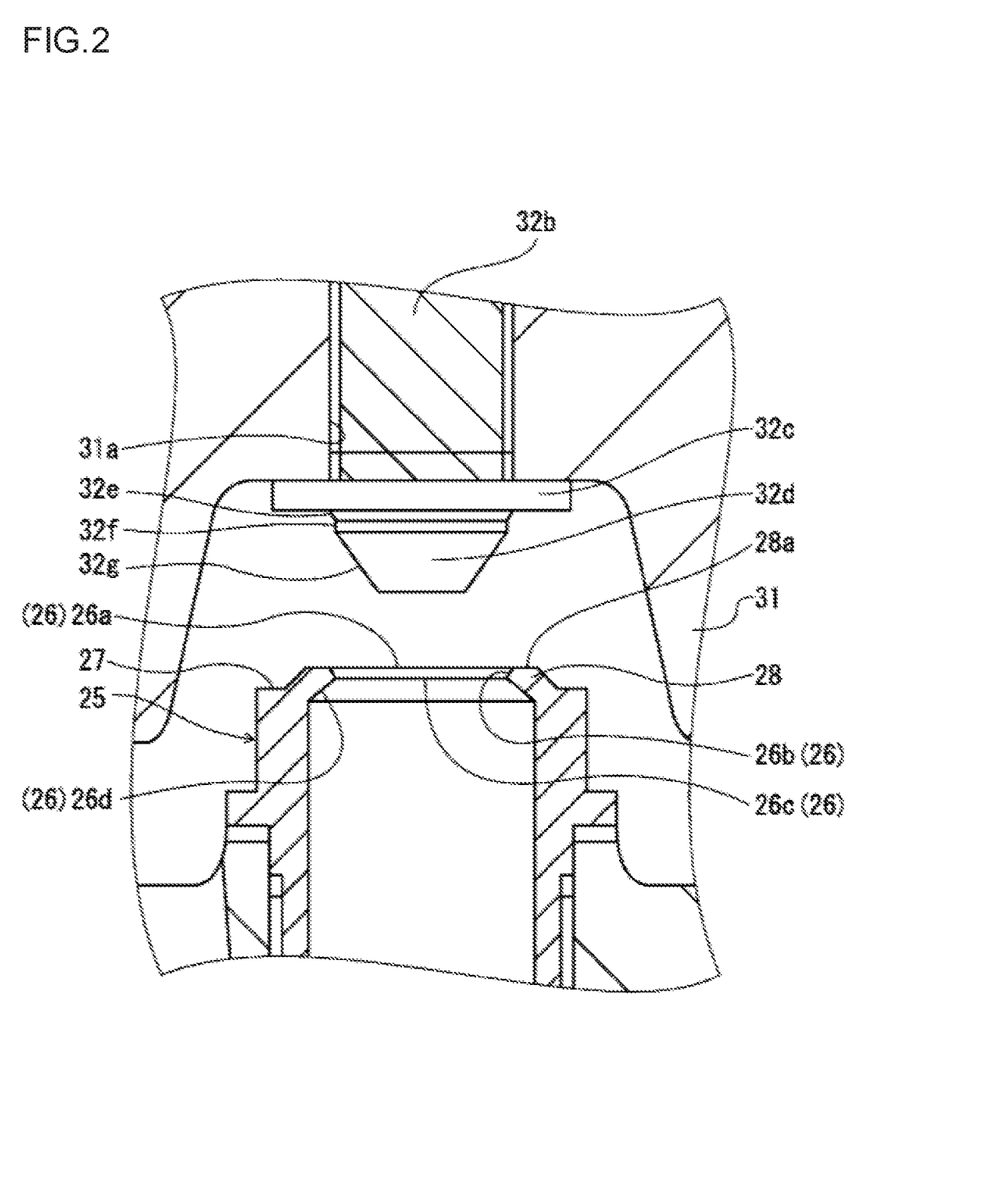
FIG. 2 is an enlarged cross-sectional view illustrating a main portion of the flow rate adjusting valve.

The valve port member 25 has a substantially cylindrical shape and is disposed in the valve port passage 18 as described above. As also illustrated in FIG. 2, the valve port member 25 is screwed to a passage wall of the valve port passage 18 in the upstream-downstream direction. A valve port 26 is formed at the center portion of the valve port member 25 and penetrates the valve port member 25 in the upstream-downstream direction. The valve port member 25 has a projection 28 formed at the center of an upstream end surface 27. The projection 28 is formed of a portion of the upstream end surface 27 located around the valve port 26 and projecting upstream. That is, an end surface 28a (upstream end surface) of the projection 28 is an opening surface of the valve port 26 and is a flat surface. The valve port 26 will be described later in detail.

The flow-rate adjusting mechanism 30 adjusts a discharge flow rate of steam in the flow rate adjusting valve 10. The flow-rate adjusting mechanism 30 is attached to an outer peripheral wall of the casing 11 where an outer end of the valve port passage 18 is located, that is, to an outer peripheral wall of the casing 11 facing the valve port member 25. The flow-rate adjusting mechanism 30 includes a holding member 31, a valve member 32, and a cap 35.

The holding member 31 holds the valve member 32 and is screwed to the outer peripheral wall of the casing 11. The valve member 32 includes a main shaft portion 32a and a valve body 32d. The main shaft portion 32a has a circular rod shape in cross section and is disposed coaxially with the valve port 26 (valve port member 25) at a position facing the valve port 26. The main shaft portion 32a is held while being screwed to a screw hole 31a of the holding member 31. Specifically, a lower end portion (an end toward the valve port 26) of the main shaft portion 32a serves as a screw portion 32b whose outer peripheral surface is provided with an external thread, and the screw portion 32b is screwed to the screw hole 31a of the holding member 31. The valve body 32d is continuous to the lower end of the main shaft portion 32a. The valve body 32d will be described later in detail. A gland packing 33 for sealing a gap between the holding member 31 and the main shaft portion 32a of the valve member 32 is mounted by a retaining member 34 on a portion of the holding member 31 above the screw hole 31a. A cap 35 covering the upper end portion of the valve member 32 and the retaining member 34 is screwed to the holding member 31.

The flow-rate adjusting mechanism 30 is configured such that the valve body 32d (valve member 32) is disposed upstream of the valve port 26 and moves forward and backward relative to the valve port 26 by rotating the valve member 32 (main shaft portion 32a) so as to adjust the opening degree of an upstream opening 26a in the valve port 26. With this adjustment of the opening degree of the valve port 26, the discharge flow rate of stream in the valve port 26 is adjusted. Specifically, the main shaft portion 32a is moved (displaced) along the arrows illustrated in FIG. 1 by rotating the main shaft portion 32a. Accordingly, the valve body 32d moves forward and backward relative to the valve port 26. When the valve body 32d moves forward to enter the valve port 26, the opening area (opening degree) of the upstream opening 26a of the valve port 26 decreases so that the discharge flow rate of steam decreases.

Configurations of Valve Port and Valve Body

As illustrated in FIG. 2, the valve port 26 includes the upstream opening 26a, a tapered portion 26b, a narrowing portion 26c, and an enlarging portion 26d. These members such as the upstream opening 26a and the tapered portion 26b are continuous and sequentially arranged in this order from the upstream side. The upstream opening 26a is an opening at the upstream end of the valve port 26, and is formed in the end surface 28a of the projection 28. The narrowing portion 26c has an opening diameter smaller than that of the upstream opening 26a. The tapered portion 26b is continuous to the upstream opening 26a and the narrowing portion 26c, and the opening diameter of the tapered portion 26b gradually decreases from the upstream opening 26a to the narrowing portion 26c. The enlarging portion 26d is continuous to the downstream end of the narrowing portion 26c, and has an opening diameter larger than that of the narrowing portion 26c. The enlarging portion 26d is tapered in such a manner that the opening diameter of the enlarging portion 26d gradually increases from the narrowing portion 26c to the downstream side. The downstream end of the enlarging portion 26d has an opening diameter larger than that of the upstream opening 26a.

The valve body 32d includes a flange portion 32c, a tapered portion 32e, a cylindrical columnar portion 32f, and a tapered portion 32g that are continuous and arranged in this order from the main shaft portion 32a. The flange portion 32c is a circular disc member having an outer diameter larger than that of the main shaft portion 32a. The flange portion 32c has an outer diameter larger than that of the projection 28 of the valve port member 25.

Figure 3:
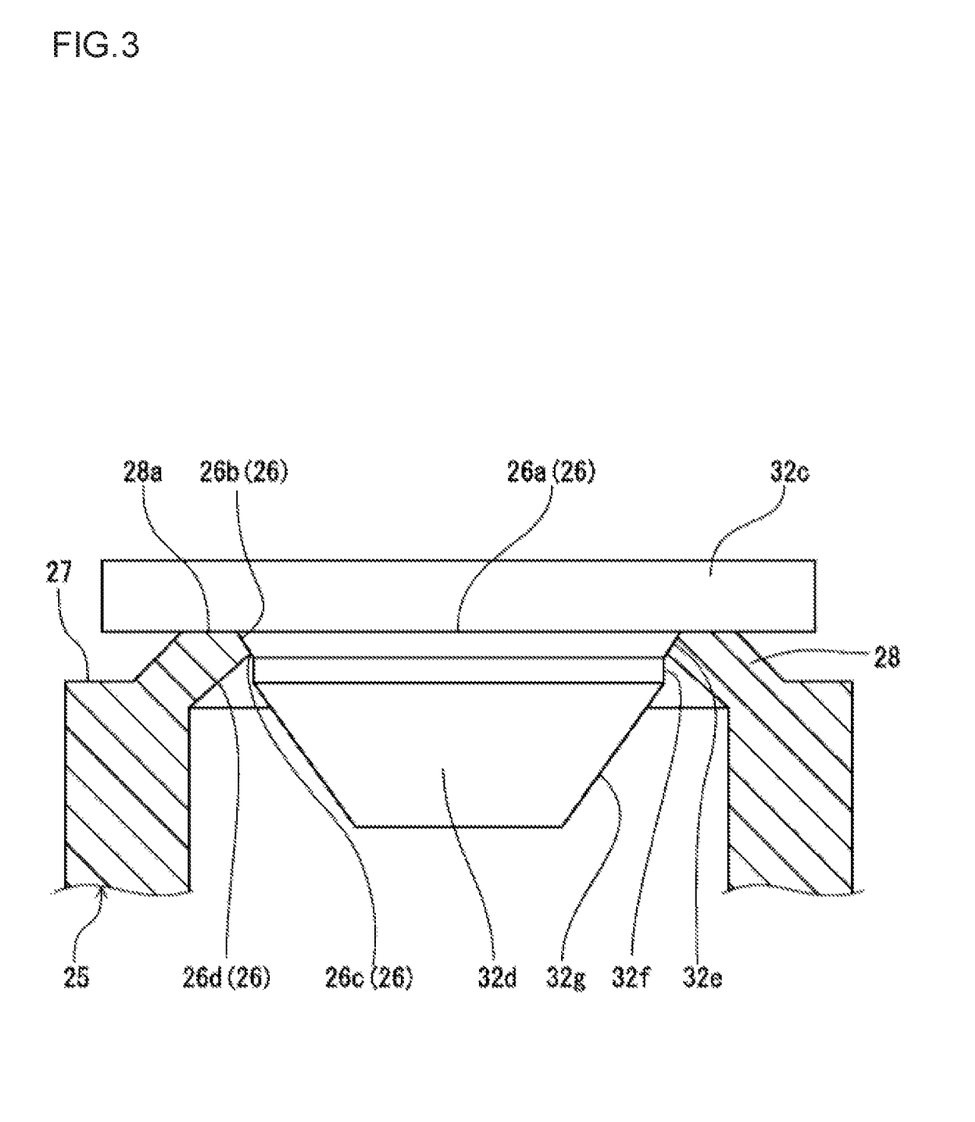
FIG. 3 is a cross-sectional view illustrating a state of a valve port according to the embodiment in a fully closed state.

The tapered portion 32e, the cylindrical columnar portion 32f, and the tapered portion 32g are portions entering the valve port 26. The tapered portion 32e extends downstream from the lower end surface of the flange portion 32c, and the outer diameter of the tapered portion 32e gradually decreases to the downstream side. As illustrated in FIG. 3, the tapered portion 32e enters the valve port 26, and is brought into surface contact with the tapered portion 26b of the valve port 26 to close the upstream opening 26a. That is, in the valve port 26, the tapered portion 26b serves as a seat portion. The tapered portion 32e has a length (length in the axial direction of the valve port 26) projecting downstream from the narrowing portion 26c while being in surface contact with the tapered portion 26b of the valve port 26. When the tapered portion 32e of the valve body 32d is brought into surface contact with the tapered portion 26b of the valve port 26 as described above, the upstream opening 26a (valve port 26) becomes fully closed. In this fully closed state, the flange portion 32c is in contact with the end surface 28a of the projection 28.

The cylindrical columnar portion 32f extends downstream from the downstream end of the tapered portion 32e, and the outer diameter of the cylindrical columnar portion 32f is equal to that of the downstream end of the tapered portion 32e. That is, the cylindrical columnar portion 32f is a portion whose outer diameter is uniform in the axial direction. The tapered portion 32g extends downstream from the downstream end of the cylindrical columnar portion 32f, and the outer diameter of the tapered portion 32g gradually decreases downstream. The tapered portion 32g is longer than each of the tapered portion 32e and the cylindrical columnar portion 32f.

Figure 4:
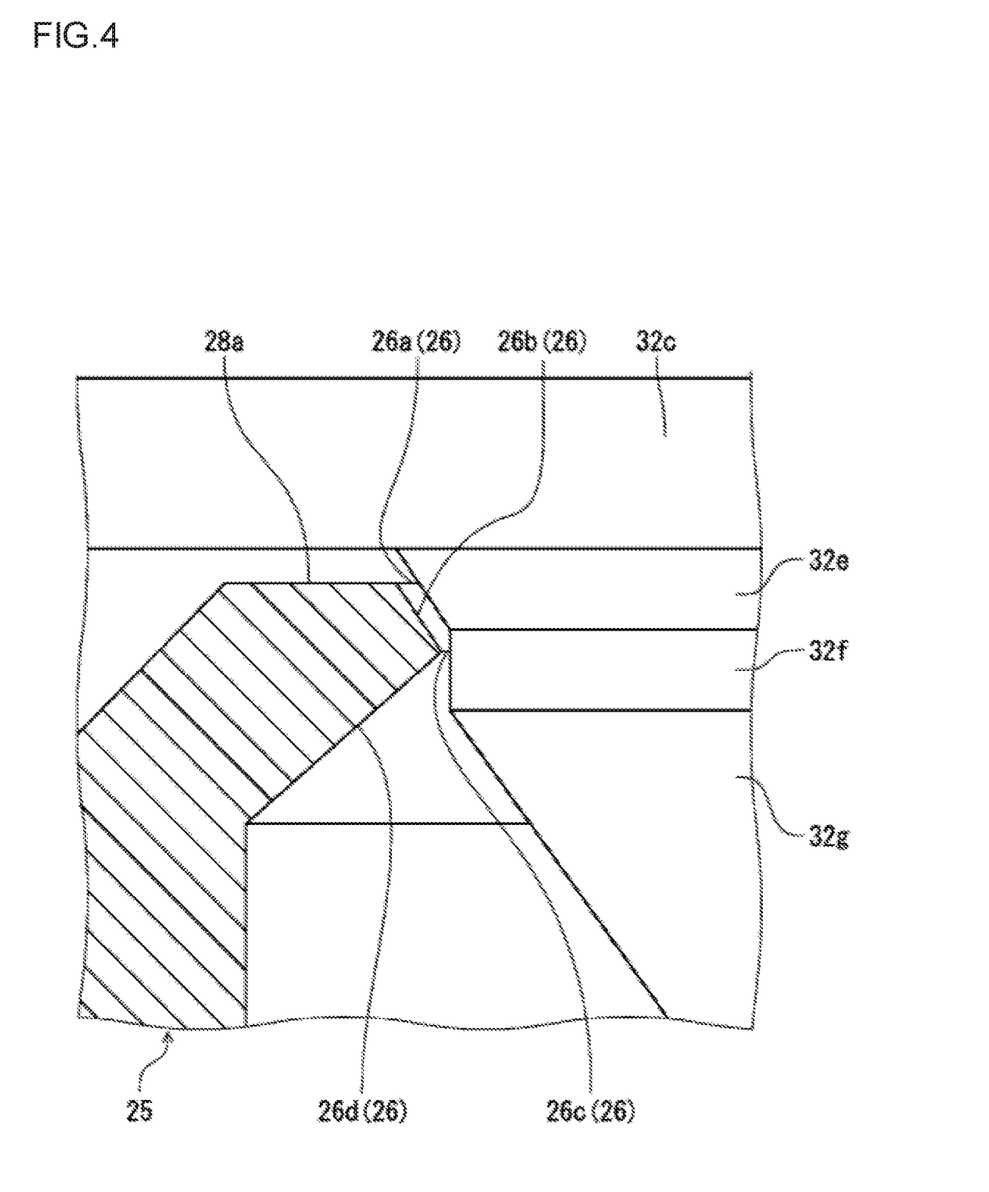
FIG. 4 is a cross-sectional view illustrating a state of the valve port according to the embodiment at a minute opening degree.

As illustrated in FIG. 4, the valve port 26 and the valve body 32d are configured such that when the upstream opening 26a is at a predetermined minute opening degree, an area of the valve port 26 through which steam passes is at minimum at the narrowing portion 26c. FIG. 4 illustrates a state where the valve body 32d (valve member 32) has slightly moved backward (moved upward) from the fully closed state. FIGS. 3 and 4 do not show the main shaft portion 32a of the valve member 32. That is, since the cylindrical columnar portion 32f is formed downstream of the tapered portion 32e in the valve body 32d, even when the valve body 32d slightly moves backward, a gap between the narrowing portion 26c and the valve body 32d (i.e., the area through which steam passes) can be minimized. While the upstream opening 26a (valve port 26) is fully open, the valve body 32d moves backward until the flange portion 32c contacts the bottom surface of the holding member 31 (the state illustrated in FIG. 1).

In the flow rate adjusting valve 10, high-temperature and high-pressure steam flows from the inlet 12 into the screen 20, passes through the screen 20, and sequentially flows in the connection passage 16 and the valve port passage 18 in this order. While the steam passes through the screen 20, foreign matter included in the steam is captured by the screen 20. The steam that has flowed through the valve port passage 18 is discharged outward from the outlet 13 through the valve port 26. While the steam passes through the valve port 26, the flow rate of discharge of the steam is restricted to a flow rate in accordance with the opening area (opening degree) of the upstream opening 26a.

Here, minute foreign matter not captured by the screen 20 might pass through the screen 20, flow toward the valve port 26, and remain near the upstream opening 26a of the valve port 26. In the flow rate adjusting valve 10 according to this embodiment, in normal operation, the upstream opening 26a of the valve port 26 is set at the predetermined opening degree described above. Since the area through which steam passes through is at minimum at the narrowing portion 26c in the valve port 26, the flow rate of the inflow steam is at maximum at the narrowing portion 26c. Thus, a negative pressure is generated at the narrowing portion 26c in the valve port 26. That is, in the valve port 26, the narrowing portion 26c serves as a negative-pressure region. With generation of this negative-pressure region, foreign matter remaining near the upstream opening 26a of the valve port 26 is sucked into the narrowing portion 26c to be discharged downstream. Accordingly, foreign matter that has passed through the screen 20 passes through the valve port 26 while neither attached nor deposited on the valve port 26.

As described above, in the flow rate adjusting valve 10 according to this embodiment, the narrowing portion 26c is provided in the valve port 26, and when the upstream opening 26a of the valve port 26 is at the predetermined opening degree (predetermined minute opening degree), the area of the valve port 26 through which steam passes is at minimum in the narrowing portion 26c. Accordingly, the flow rate of steam can be set at maximum at the narrowing portion 26c in the valve port 26, and thereby, a negative pressure can be generated in the narrowing portion 26c. With this negative pressure, foreign matter remaining near the upstream opening 26a can be sucked and discharged downstream from the valve port 26. As a result, attachment and deposition of foreign matter on the valve port 26 can be prevented.

In addition, since the enlarging portion 26d is provided downstream of the narrowing portion 26c in the valve port 26, the flow rate of steam in the narrowing portion 26c can be stabilized. Accordingly, a negative pressure can be generated stably in the narrowing portion 26c.

Furthermore, a portion of the valve port 26 connected to the narrowing portion 26c from the upstream opening 26a serves as the tapered portion 26b. Thus, foreign matter that has flowed into the tapered portion 26b easily flows downstream by its weight. Accordingly, foreign matter can be effectively discharged downstream from the valve port 26 without being attached to the valve port 26.

In the valve port 26, the tapered portion 26b serves as a seat portion, and the tapered portion 32e of the valve body 32d is brought into surface contact with the tapered portion 26b to close the upstream opening 26a (valve port 26). Thus, sealing performance can be stabilized.

The tapered portion 32e in the valve body 32d projects downstream from the narrowing portion 26c in the state where the tapered portion 32e is in surface contact with the tapered portion 26b of the valve port 26. In addition, the valve body 32d further includes a cylindrical columnar portion 32f whose outer diameter is equal to that of the downstream end of the tapered portion 32e and extends downstream from the downstream end of the tapered portion 32e. Accordingly, in a state where the valve body 32d slightly moves backward and the upstream opening 26a is set at a minute opening degree, a gap (i.e., the area through which steam passes) can be formed between the narrowing portion 26c and the cylindrical columnar portion 32f (valve body 32d), and the size of this gap can be minimized.

Furthermore, since the cylindrical columnar portion 32f has a uniform length, the gap between the narrowing portion 26c and the cylindrical columnar portion 32f (valve body 32d) can be minimized in a wide range of the opening degree. Thus, the range of adjustment of the opening degree of the upstream opening 26a can be enlarged.

In the valve port 26, since the enlarging portion 26d is tapered, occurrence of cavitation in the enlarging portion 26d can be suppressed, as compared to a configuration in which the opening diameter rapidly increases.

In addition, even if foreign matter is attached and deposited on the end surface 28a of the projection 28 in the valve port member 25, the valve body 32d is moved forward and the flange portion 32c is moved to the end surface 28a of the projection 28 (i.e., is made in a fully closed state). Accordingly, the foreign matter deposited on the end surface 28a can be crushed by the flange portion 32c. Since the projection 28 protrudes in the valve port member 25, the crushed foreign matter flows to the surroundings from the projection 28. In this manner, foreign matter can be removed from the end surface 28a.

Other Embodiments

Figure 5:
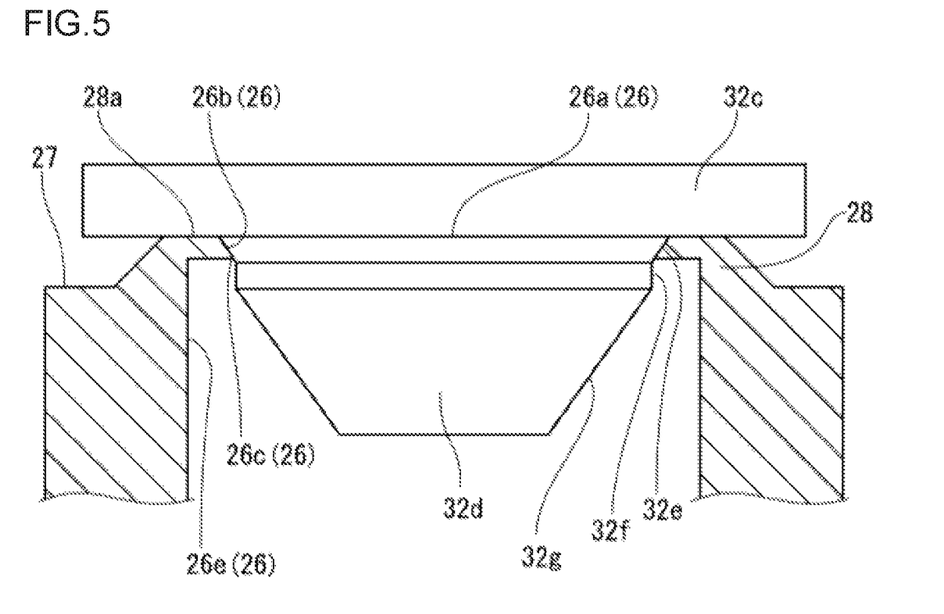
FIG. 5 is a cross-sectional view illustrating a state of a valve port according to another embodiment in a fully closed state.

In the flow rate adjusting valve 10 according to the embodiment described above, configurations of the valve port and the valve body may be changed as follows. For example, as illustrated in FIG. 5, in the valve port 26, the enlarging portion 26e formed downstream of the narrowing portion 26c does not need to be tapered, and the opening diameter of the enlarging portion 26e may increase rapidly.

Figure 6:
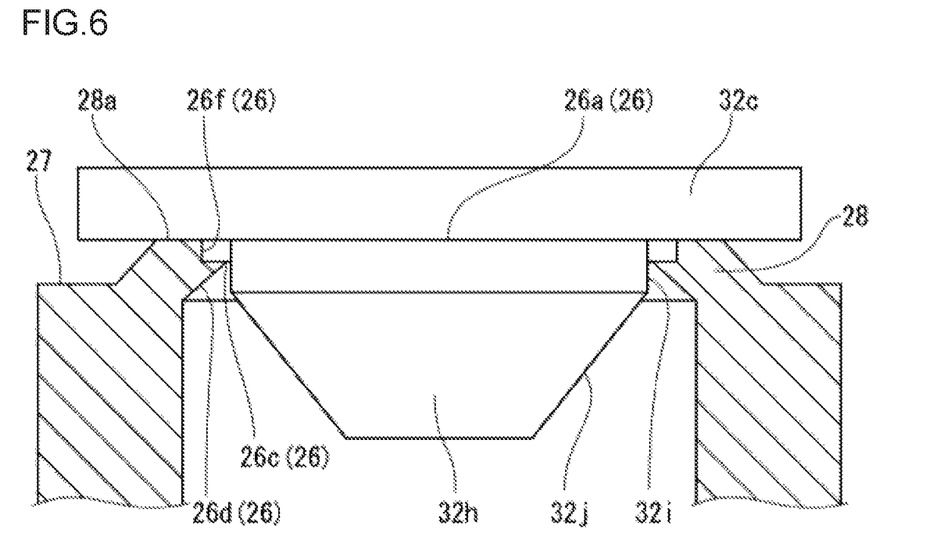
FIG. 6 is a cross-sectional view illustrating a state of a valve port according to yet another embodiment in a fully closed state.

As illustrated in FIG. 6, a portion of the valve port 26 connected to the narrowing portion 26c from the upstream opening 26a may be a cylindrical columnar portion 26f having a uniform opening diameter. A portion of the valve body 32h downstream of the flange portion 32c may be constituted by the cylindrical columnar portion 32i and the tapered portion 32j. In any of the configurations illustrated in FIGS. 5 and 6, in a manner similar to the embodiment described above, the area of the valve port 26 through which steam passes is at minimum at the narrowing portion 26c when the upstream opening 26a of the valve port 26 has a predetermined opening degree (predetermined minute opening degree).

In the flow rate adjusting valve 10 according to the embodiment described above, the screen 20 and/or the blow valve 22 may be omitted.

The technique disclosed in the present application is useful for a valve mechanism including a valve port and configured to discharge a fluid from the valve port.

What is claimed is:

1. A valve mechanism comprising:
a casing including an inlet and an outlet of a fluid and also including a channel connecting the inlet and the outlet to each other;
a valve port member disposed in the channel, the valve port member including a valve port penetrating the valve port member in an upstream-downstream direction; and
a valve body that is disposed upstream of the valve port and moves forward and backward relative to the valve port to adjust an opening degree of an upstream opening of the valve port, wherein
the valve port includes
a narrowing portion having an opening diameter smaller than an opening diameter of the upstream opening and
an enlarging portion continuous to a downstream side of the narrowing portion and having an opening diameter larger than the opening diameter of the narrowing portion,
when the upstream opening is at a predetermined opening degree, an area of the valve port through which the fluid passes is at minimum at the narrowing portion,
the valve port includes a tapered portion whose opening diameter gradually decreases from the upstream opening to the narrowing portion and,
the valve body includes
a tapered portion that enters the valve port and comes into surface contact with the tapered portion of the valve port to close the upstream opening and, while being in contact with the tapered portion of the valve port, projects downstream from the narrowing portion, and
a flange portion having a circular disc shape, being continuous to an upstream end of the tapered portion, and being configured to contact an upstream end surface of the valve port member when the tapered portion is brought into surface contact with the tapered portion of the valve port, wherein
the valve body includes a cylindrical columnar portion that has an outer diameter equal to an outer diameter of a downstream end of the tapered portion of the valve body and extends downstream from the downstream end.

2. The valve mechanism according to claim 1, wherein the enlarging portion of the valve port has a tapered shape whose opening diameter gradually increases from the narrowing portion.

3. The valve mechanism according to claim 1, wherein the upstream end surface of the valve port member includes a projection formed of a portion of the upstream end surface located around the valve port and projecting upstream, and
the flange portion is configured to contact an end surface of the projection when the tapered portion of the valve body is brought into surface contact with the tapered portion of the valve port.

* * * * *